(12) United States Patent
Shinoda et al.

(10) Patent No.: US 9,102,842 B2
(45) Date of Patent: Aug. 11, 2015

(54) INK COMPOSITION AND RECORDING APPARATUS

(71) Applicant: Seiko Epson Corporation, Tokyo (JP)

(72) Inventors: Tomoki Shinoda, Shiojiri (JP); Akihito Sao, Matsumoto (JP); Keiji Iida, Chikuhoku (JP); Makoto Nagase, Shiojiri (JP); Miho Nakamura, Shiojiri (JP); Kenichiro Kubota, Shiojiri (JP)

(73) Assignee: Seiko Epson Corporation (JP)

( * ) Notice: Subject to any disclaimer, the term of this patent is extended or adjusted under 35 U.S.C. 154(b) by 175 days.

(21) Appl. No.: 13/852,449

(22) Filed: Mar. 28, 2013

(65) Prior Publication Data

US 2013/0293643 A1    Nov. 7, 2013

(30) Foreign Application Priority Data

May 1, 2012  (JP) ................................. 2012-104469
Oct. 18, 2012  (JP) ................................. 2012-230526

(51) Int. Cl.
*C09D 11/38* (2014.01)
*B41J 2/175* (2006.01)
(Continued)

(52) U.S. Cl.
CPC ............ *C09D 11/38* (2013.01); *B41J 2/17556* (2013.01); *B41J 2/17596* (2013.01); *C09D 11/10* (2013.01); *C09D 11/32* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41J 2/175; B41J 2/17513; B41J 2/17509; B41J 2/17596; B41J 2/17553; B41J 2/1752; B41J 2/17523; B41J 2/17556; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 96, 101, 102, 103, 88, 21, 347/9, 84–86; 106/31.6, 31.27, 31.13; 523/160, 161
See application file for complete search history.

(56) References Cited

U.S. PATENT DOCUMENTS 5,431,720 A * 7/1995 Nagai et al. .................... 347/100
5,954,866 A * 9/1999 Ohta et al. .................. 106/31.89
7,125,447 B2  10/2006 Sugita et al.
(Continued)

FOREIGN PATENT DOCUMENTS

JP    10-298481    11/1998
JP    2003-012989   1/2003
(Continued)

*Primary Examiner* — Manish S Shah
(74) *Attorney, Agent, or Firm* — Harness, Dickey & Pierce, P.L.C.

(57) ABSTRACT

Disclosed is ink composition used in a recording apparatus provided with a pressure regulation valve which performs opening and closing operations to adjust a pressure in a recording head and is covered with an elastic member. The ink composition includes a slip agent and a lactone system medium. The slip agent is preferably at least one kind selected from a group consisting of a silicon system compound, a hydrocarbon system compound, a fluorine system compound, an amide system compound, and acrylic compound. In addition, the content of the slip agent is preferably not more than 1% by mass.

14 Claims, 3 Drawing Sheets

(51) Int. Cl.
*C09D 11/10* (2014.01)
*C09D 11/32* (2014.01)

(56) References Cited

U.S. PATENT DOCUMENTS

2004/0266907 A1* 12/2004 Sugita et al. .................. 523/160
2007/0242118 A1* 10/2007 Koganehira et al. .......... 347/100
2008/0225090 A1* 9/2008 Kobayashi ..................... 347/85
2008/0231671 A1* 9/2008 Lee et al. ........................ 347/85
2009/0286004 A1 11/2009 Oh et al.
2010/0289859 A1* 11/2010 Oyanagi et al. ............... 347/102

FOREIGN PATENT DOCUMENTS

| | | |
|---|---|---|
| JP | 2004-249560 | 9/2004 |
| JP | 2009-283907 | 12/2009 |
| JP | 2011-213933 | 10/2011 |
| WO | 2004-007626 | 1/2004 |

* cited by examiner

INK COMPOSITION AND RECORDING APPARATUS

Priority is claimed under 35 U.S.C. §119 to Japanese Application No. 2012-104469 filed on May 1, 2012 and No. 2012-230526 filed on Oct. 18, 2012, which are hereby incorporated by reference in their entirety.

BACKGROUND

1. Technical Field

The present invention relates to ink composition and a recording apparatus.

2. Related Art

In the related art, image recording by applying ink composition from a recording apparatus such as an ink jet recording apparatus to a recording medium such as a paper has been known.

The ink composition is generally obtained by dissolving or dispersing colorant in a medium, and various additives are further added thereto.

As an additive to be added to the ink composition, a slip agent has been known (see JP-A-2011-213933, for example). By adding the slip agent, it is possible to improve abrasion resistance of a printed surface and prevent abrasion on the printed surface.

However, such a slip agent has a problem that an influence of the slip agent on an elastic member such as rubber in the recording apparatus (particularly, a pressure regulation valve with which the ink composition is brought into contact) is reduced and opening and closing operations of the pressure regulation valve is disturbed. More specifically, there is a problem that a sealing portion (elastic member) of the pressure regulation valve comes off and it is not possible to perform opening and closing operations of a flow path.

SUMMARY

An advantage of some aspects of the invention is to provide ink composition capable of reducing an influence of a slip agent on an elastic member such as a pressure regulation valve, suppressing disturbance of opening and closing operations by the pressure regulation valve, and recording an image with excellent abrasion resistance and to provide a recording apparatus capable of forming an image with excellent abrasion resistance.

Some aspects of the invention are adapted to achieve such an advantage.

According to an aspect of the invention, there is provided ink composition used in a recording apparatus provided with a pressure regulation valve which performs opening and closing operations to adjust a pressure in a recording head and is covered with an elastic member, the ink composition including: slip agent; and a lactone system medium.

In this case, it is possible to provide the ink composition capable of reducing an influence of the slip agent on the elastic member such as the pressure regulation valve, suppressing disturbance of the opening and closing operations of the pressure regulation valve, and recording an image with excellent abrasion resistance.

According to the aspect of the invention, the slip agent is preferably at least one kind selected from a group consisting of a silicon system compound, a hydrocarbon system compound, a fluorine system compound, an amide system compound, and an acrylic compound.

In this case, it is possible to reduce the influence of the slip agent on the elastic member such as the pressure regulation valve, suppress the disturbance of the opening and closing operations of the pressure regulation valve, and obtain a recorded image with more excellent abrasion resistance.

According to the aspect of the invention, the silicon system compound is preferably a compound represented by the following Formula (1):

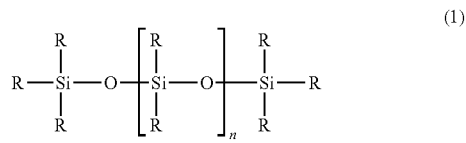

where, n is an integer from 6 to 230, R independently represents hydrogen or a hydrocarbon group, and a part of R may be modified with ether, polyester, epoxy, amine, carboxyl, fluorine, alkyloxy, mercapto, (meth)acryl, phenol, phenyl, cabinol, or aralkyl.

In this case, it is possible to reduce the influence of the slip agent on the elastic member such as the pressure regulation valve, suppress the disturbance of the opening and closing operations of the pressure regulation valve, and obtain a recorded image with particularly excellent abrasion resistance.

According to the aspect of the invention, content of the slip agent is preferably not more than 1% by mass.

In this case, it is possible to more effectively enhance the abrasion resistance of the recorded image.

According to the aspect of the invention, the lactone system medium is preferably γ-lactone.

In this case, it is possible to more effectively reduce the influence of the slip agent imparted on the elastic member such as the pressure regulation valve.

According to the aspect of the invention, the γ-lactone is preferably at least one kind selected from a group consisting of γ-butyrolactone and γ-valerolactone.

In this case, it is possible to more effectively reduce the influence of the slip agent imparted on the elastic member such as the pressure regulation valve.

According to the aspect of the invention, the elastic member is preferably at least one kind selected from a group consisting of natural rubber, styrene-butadiene rubber, acrylonitrile-butadiene rubber, chloroprene rubber, neoprene rubber, polyvinyl chloride, polyethylene, polypropylene, acrylonitrilebutadiene, polystyrene, polyamide, polyurethane, silicon resin, epoxy resin, phenol resin, urea resin, and fluorine resin.

In this case, it is possible to more preferably suppress the disturbance of the opening and closing operations of the pressure regulation valve.

According to another aspect of the invention, there is provided a recording apparatus including: ink composition according to the above aspect of the invention; and a pressure regulation valve which performs opening and closing operations to adjust a pressure in a recording head and is covered with an elastic member.

In this case, it is possible to obtain a recording medium with excellent abrasion resistance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
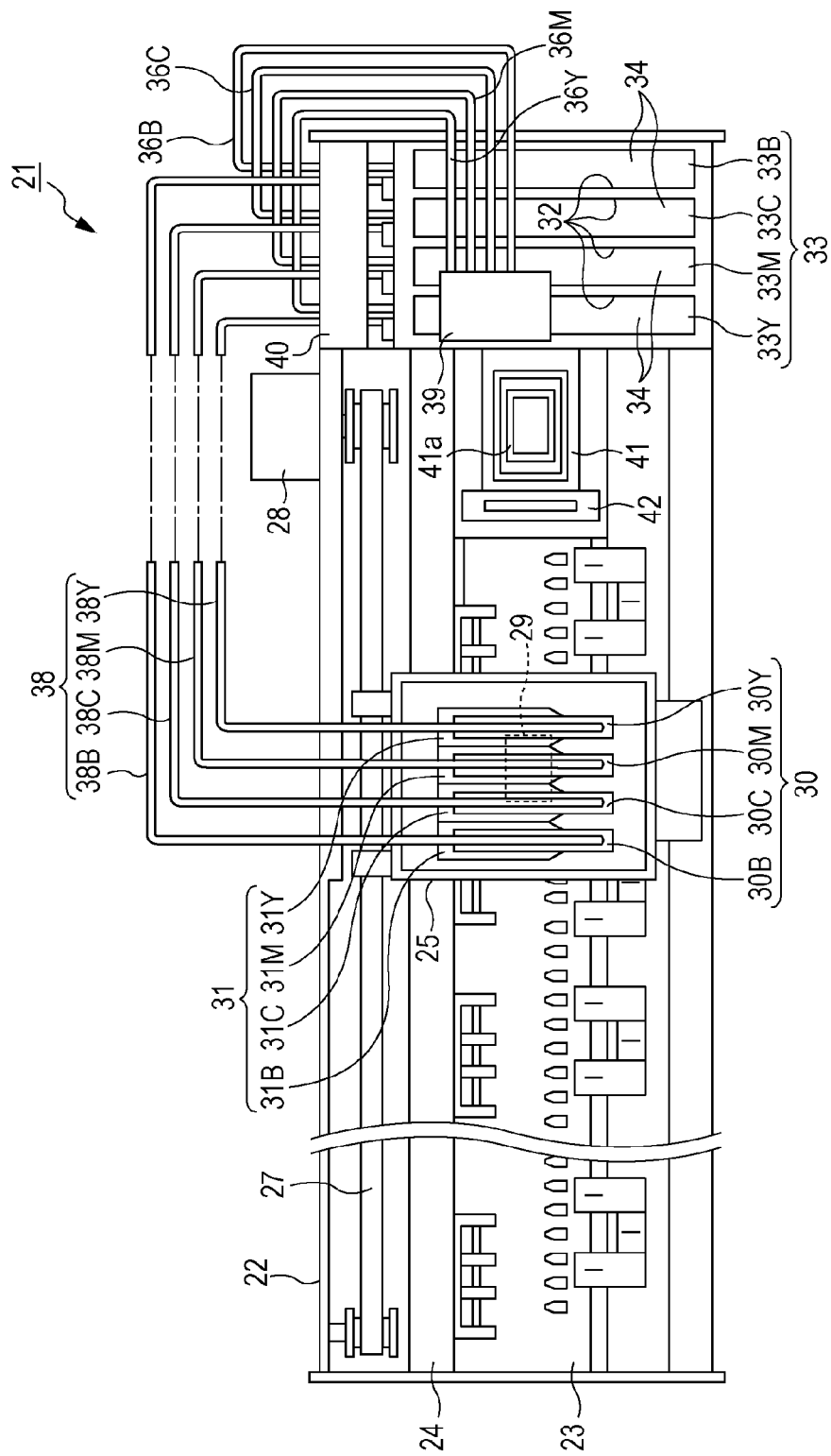
FIG. 1 is a diagram schematically showing an example of a recording apparatus (ink jet recording apparatus).

Hereinafter, a detailed description will be given of preferable embodiments of the invention.

Ink Composition

First, a description will be given of ink composition according to the invention.

The ink composition according to an embodiment of the invention is ink which is used in a recording apparatus provided with a pressure regulation valve and applied to a recording medium by using the recording apparatus to record an image.

Incidentally, the ink composition is generally obtained by dissolving or dispersing colorant in a medium, and various additives are further added thereto. As such an additive to be added to the ink composition, a slip agent has been known. By adding the slip agent, it is possible to enhance abrasion resistance of a printed surface and prevent abrasion on the printed surface.

However, such a slip agent has a problem that the slip agent adversely affects an elastic member (particularly, a pressure regulation valve with which the ink composition is brought into contact) such as rubber in the recording apparatus and disturbs opening and closing operations of the pressure regulation valve.

On the other hand, the ink composition according to an embodiment of the invention is characterized by including a slip agent along with the lactone system medium. With such a characteristic, it is possible to reduce the influence of the slip agent on the elastic member such as a pressure regulation valve and suppress disturbance of the opening and closing operations of the pressure regulation valve by the slip agent. In addition, it is possible to record an image, with excellent abrasion resistance, by including the slip agent.

Hereinafter, a detailed description will be given of respective constituents.

Slip Agent

The slip agent means an additive which has a function of preventing abrasion on the recorded surface by enhancing a slipping property (abrasion resistance) of the recorded surface.

Although the slip agent is not particularly limited, it is preferable to use at least one kind selected from a group consisting of a silicon system compound, a hydrocarbon system compound, a fluorine system compound, an amide system compound, and an acrylic compound. By using such a compound, it is possible to reduce the influence of the slip agent on the elastic member such as the pressure regulation valve, suppress the disturbance of the opening and closing operations of the pressure regulation valve, and obtain a recorded image with more excellent abrasion resistance. In addition, the most preferable material among the examples is a silicon system compound. When the slip agent configured by a silicon system compound is used, the problem significantly appears in the pressure regulation valve. However, it is possible to satisfactorily prevent the problem by including the lactone system medium.

As the silicon system compound, a compound represented by the following Formula (1) is preferably used.

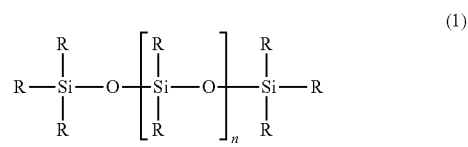

where n is an integer of not less than 6 and not more than 230, R independently represents hydrogen or a hydrocarbon group, and a part of R may be independently modified with ether, polyester, epoxy, amine, carboxyl, fluorine, alkyloxy, mercapto, (meth)acryl, phenol, phenyl, carbinol, or aralkyl.

By using the silicon system compound with such a structure as the slip agent, it is possible to reduce the influence of the slip agent on the elastic member such as the pressure regulation valve, suppress the disturbance of the opening and closing operations of the pressure regulation valve, and obtain a recorded image with particularly excellent abrasion resistance.

n in Formula (1) is preferably an integer of not less than 6 and not more than 230, more preferably an integer of not less than 12 and not more than 200, and further more preferably an integer of not less than 45 and not more than 200. In doing so, it is possible to further enhance the abrasion resistance of the recorded image.

In addition, methylsiloxane in which any of R in Formula (1) is a methyl group is preferable from a viewpoint of enhancing the abrasion resistance. Furthermore, the silicon compound of Formula (1) is preferably a dimethylsiloxane compound which includes a dimethysiloxane skeleton in the structure from a viewpoint of enhancing the abrasion resistance. Moreover, at least a part of modification of R is preferably ether-modification or ester-modification in the case of a modified silicon compound in which R is modified.

Examples of the silicon system compound include polymethylalkyl siloxane, dimethylpolysiloxane, polyester-modified polymethylalkyl siloxane, polyether-modified polymethylalkyl siloxane, and polyester-modified hydroxypolymethylsiloxane. One kind or two or more kinds of the examples can be used in combination.

Specific examples of such a silicon system compound include BYK-300, BYK-301/302, BYK-306, BYK-307, BYK-310, BYK-313, BYK-315, BYK-330, BYK-331, BYK-333, BYK-337, BYK-342, BYK-370, BYK-371, BYK-375, BYK-377, BYK-378, BYK-UV3500, and BYK-UV3510 (all of which are manufactured by BYK Additives and Instruments). In addition, BYK-347 and 348 are silicon system compounds which do not have a function of the slip agent.

The hydrocarbon system compound is not particularly limited, and examples thereof include polyethylene wax, polypropylene wax, carnauba wax, paraffin wax, and lanolin wax. One kind or two or more kinds of the examples can be used in combination.

The fluorine system compound is not particularly limited, and examples thereof include perfluoroalkane, perfluorocarboxylic acid ester, a perfluoro organic compound and fluorinated polymer. One kind or two or more kinds of the examples can be used in combination.

The amide system compound is not particularly limited, and examples thereof include cis-13-docosenamide, oleic amide, and erucamide. One kind or two or more kinds of the examples can be used in combination.

The acrylic compound is not particularly limited, and examples thereof include silicon-modified (meth)acrylate, polyether-modified (meth)acrylate, and polyester-modified (meth)acrylate. One kind or two or more kinds of the examples can be used in combination.

The content of the aforementioned slip agent in the ink composition is preferably not more than 1.0% by mass, and more preferably not less than 0.05% by mass and not more than 1.0% by mass. If the content of the slip agent is within the above range, it is possible to more effectively enhance the abrasion resistance of the recorded image. If the content of the slip agent exceeds the above upper limit value, ejection stability of the ink composition deteriorates in some cases.

Lactone System Medium

The ink composition according to an embodiment of the invention includes a lactone system medium. By including the lactone system medium, it is possible to reduce the influence of the slip agent imparted on the elastic member such as the pressure regulation valve and suppress opening and closing operation failure of the elastic member.

Examples of the lactone system medium include β-propiolactone, β-butyrolactone, γ-butyrolactone, α-methyl-γ-butyrolactone, γ-valerolactone, γ-caprolactone, ε-caprolactone, γ-laurolactone, δ-valerolactone, and hexanolactone. One kind or two or more kinds of the examples can be used in combination.

Among the aforementioned lactone system media, it is preferable to use γ-lactone such as γ-butyrolactone, α-methyl-γ-butyrolactone, γ-valerolactone, γ-caprolactone, and γ-laurolactone, and more preferable to use at least one kind selected from a group consisting of γ-butyrolactone and γ-valerolactone. In doing so, it is possible to more effectively reduce the influence of the slip agent imparted on the elastic member such as the pressure regulation valve.

The content of the lactone system medium in the ink composition is preferably not less than 3% by mass and not more than 40% by mass, more preferably not less than 4% by mass and not more than 20% by mass, and the most preferably not less than 4% by mass and not more than 8% by mass. If the content of the lactone system medium is within the above range, it is possible to more effectively reduce the influence of the slip agent imparted on the elastic member such as the pressure regulation valve. In addition, it is possible to more effectively enhance the ejection stability of the ink composition.

Other Constituents

The ink composition according to an embodiment of the invention may include the following constituents in addition to the above constituents.

Solvent

The ink composition according to an embodiment of the invention may include solvent other than the aforementioned lactone system medium.

Examples of the solvent include non-polar solvent, aprotic polar solvent, and protic polar solvent.

Non-Polar Solvent

The ink composition according to an embodiment of the invention may include non-polar solvent.

Examples of the non-polar solvent include hexane and carbon tetrachloride.

Aprotic Polar Solvent

The ink composition according to an embodiment of the invention may include aprotic polar solvent other than the lactone system medium. By including aprotic polar solvent, it is possible to more stably blend the slip agent and further enhance the abrasion resistance. In addition, it is possible to further enhance the ejection stability.

Examples of the aprotic polar solvent other than the lactone system medium include pyrrolidones, sulfoxides, imidazolidinones, sulfolanes, urea derivatives, dialkylamides, cyclic ethers, glycol ethers, and amide ethers. One kind or two or more kinds of the examples can be used in combination.

Examples of pyrrolidones include 2-pyrrolidone, N-methyl-2-pyrrolidone, and N-ethyl-2-pyrrolidone.

Examples of sulfoxides include dimethylsulfoxide and tetramethylenesulfoxide.

Examples of imidazolidinones include 2-imidazolidinone, 1,3-dimethyl-2-imidazolidinone, 1-acetyl-2-imidazolidinone, and 4-(3-butoxy-4-methoxybenzyl)-2-imidazolidinone.

Examples of sulfolanes include sulfolane and diethylsulfolane.

Examples of urea derivatives include dimethyl urea and 1,1,3,3-tetramethyl urea.

Examples of dialkylamides include dimethylformamide and dimethylacetamide.

Examples of cyclic ethers include 1,4-dioxane and tetrahydrofuran.

Examples of cyclic ethers include diethylene glycol monomethyl ether, diethylene glycol dimethyl ether, diethylene glycol methyl ethyl ether, diethylene glycol monoethyl ether, diethylene glycol diethyl ether, diethylene glycol mono n-butyl ether, diethylene glycol di n-butyl ether, diethylene glycol butyl methyl ether, dipropylene glycol monomethyl ether, dipropylene glycol monoethyl ether, triethylene glycol monomethyl ether, triethylene glycol monobutyl ether, tripropylene glycol monobutyl ether, tetraethylene glycol monomethyl ether, pentaethylene glycol monomethyl ether, hexaethylene glycol monomethyl ether, tetraethylene glycol dimethyl ether, diethylene glycol monoethyl ether acetate, and diethylene glycol mono n-butyl ether acetate.

In addition, the medium represented by the following Formula (2) corresponds to the amide ethers.

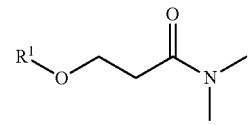

(2)

In the formula, $R^1$ is preferably an alkyl group including one to four carbons. The "alkyl group including one to four carbons" may be a linear or branched alkyl group, and may be a methyl group, an ethyl group, an n-propyl group, an iso-propyl group, an n-butyl group, an iso-butyl group, a sec-butyl group, and a tert-butyl group.

By including the medium represented by Formula (2) in which $R^1$ is an alkyl group including one to four carbons, it is possible to provide appropriate pseudoelasticity to the ink composition and to thereby further enhance the ejection stability of the ink composition. In addition, it is possible to further stably blend the slip agent and further enhance the abrasion resistance of the recorded image.

An HLB value of the medium represented by Formula (2) is preferably not less than 10.5 and not more than 20.0, and more preferably not less than 12.0 and not more than 18.5. It is further preferable that the HLB value of the medium represented by Formula (2) be within the above range in terms of provision of appropriate pseudoelasticity to the ink and an interaction with a resin constituent.

In addition, the HLB value of the medium represented by Formula (2) is a value calculated by the following equation based on a ratio between a non-polar value (I) and an organic nature value (O) in an organic conceptual diagram (hereinafter, also simply referred to as an "I/O value").

$$HLB\ value = (non\text{-}polar\ value(I)/organic\ nature\ value\ (O)) \times 10$$

Specifically, the I/O value can be calculated based on the respective literatures of "Systematic organic qualitative analysis, mixture series)" (written by Makoto Fujita, Kazamashobo Co., Ltd., 1974), "dyeing theoretical chemistry" (written by Nobuhiko Kuroki, Makishoten Publishing Co., Ltd., 1966), and "Organic compound separation method" (written by Hiroo Inoue, Shokabo Publishing Co., Ltd, 1990).

Among the examples of aprotic polar solvent, it is preferable to use at least one kind selected from a group consisting of pyrrolidones, sulfoxides, and amide ethers since it is possible to achieve an advantageous effect that fixability to the recording medium is enhanced.

The content of the aprotic polar solvent including the lactone system medium in the ink composition is preferably not less than 4% by mass and not more than 28% by mass. In doing so, it is possible to further enhance the ejection stability of the ink composition. In addition, it is possible to more stably blend the slip agent and further enhance the abrasion resistance of the recorded image.

Protic Polar Solvent

The ink composition according to an embodiment of the invention may include protic polar solvent. By including the protic polar solvent, it is possible to enhance dispersibility of pigment which will be described later.

Examples of the protic polar solvent include water and alcohols such as ethanol and butanol.

Surfactant

The ink composition according to an embodiment of the invention may include surfactant.

Examples of the surfactant include silicon system surfactant, fluorine system surfactant, and polyoxyethylene derovatove as non-ionic surfactant.

As the silicon system surfactant, it is possible to use polyester-modified silicon or polyether-modified silicon, for example. Specific examples thereof include BYK-347, 348, 3530, and 3570 (all of which are manufactured by BYK Additives and Instruments). In addition, BYK-347 and 348 are silicon system compounds which do not have a function as the slip agent.

As the fluorine system surfactant, it is preferable to use fluorine modified polymer, and specific examples thereof include BYK-340 (Manufactured by BYK additives and Instruments).

As the polyoxyethylene derivative, it is preferable to use acetylenic glycol system surfactant. Specific examples thereof include Surfynol 82, 104, 465, 485, and TG (all of which are manufactured by Air Products Japan, Inc.), Olfine STG and E1010 (all of which are manufactured by Nisshin Chemical Co., Ltd.), Nissan Nonion A-10R and A-13R (all of which are manufactured by NOF Corporation), Floren TG-740W and D-90 (manufactured by Kyoeisha Chemical Co., Ltd.), and Noigen CX-100 (manufactured by Dai-ichi Kogyo Seiyaku Co., Ltd.).

The content of the surfactant in the ink composition is preferably not less than 0.05% by mass and not more than 3% by mass, and more preferably not less than 0.5% by mass and not more than 2% by mass.

Colorant

The ink composition according to an embodiment of the invention may include colorant.

As the colorant, it is possible to use pigment such as colored inorganic pigment or colored organic pigment which is generally used in the ink composition in the related art. One kind or two or more kinds of such pigment may be used alone or in combination.

Examples of the pigment include azo pigment such as azolake, insoluble azo pigment, condensed azo pigment, and chelateazo pigment; polycyclic pigment such as phthalocyanine pigment, perylene and perylene pigment, anthraquinone pigment, quinacridone pigment, dioxazine pigment pigment, thioindigo pigment, isoindolinone pigment, and quinophthalone pigment; dye lake such as basic dye type lake and acid dye type lake; organic pigment such as nitro pigment, nitroso pigment, aniline black, and daylight fluorescent; and inorganic pigment such as carbon black. Although an average primary particle size of pigment particles is not particularly limited, the average primary particle size is preferably not less than 50 nm and not more than 500 nm.

Examples of pigment when the ink composition is configured as magenta ink or red ink include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, and C.I. Pigment Red 224.

Examples of pigment when the ink composition is configured as orange ink or yellow ink include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

Examples of pigment when the ink composition is configured as green ink or cyan ink include C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

Examples of pigment when the ink composition is configured as black ink include carbon black.

Examples of pigment when the ink composition is configured as white ink include Pigment White 6, 18, and 21.

Although the content of the colorant in the ink composition can be appropriately selected depending on a use purpose and a printing property, the content is preferably not less than 0.5% by mass and not more than 25% by mass, and more preferably not less than 0.5% by mass and not more than 15% by mass, and further more preferably not less than 1% by mass and not more than 10% by mass.

Dispersant

The ink composition according to an embodiment of the invention may include dispersant from a viewpoint of enhancing dispersion stability of the pigment.

As the dispersant, it is preferable to use dispersant which advantageously acts when a dissolution parameter of the solvent is not less than 8 and not more than 11. Specific examples of such dispersant include polyester system polymer compound such as Hinoact KF1-M, T-6000, T-7000, T-8000, T-8350P, and T-8000E (all of which are manufactured by Takefu Fine Chemicals Co., Ltd.), Solsperse 20000, 24000, 32000, 32500, 33500, 34000, 35200, and 37500 (all of which are manufactured by The Lubrizol Corporation), Disperbyk-161, 162, 163, 164, 166, 180, 190, 191, and 192 (all of which are manufactured by BYK Additives and Instruments), Floren DOPA-17, 22, 33, and G-700 (all of which are manufactured by Kyoeisha Chemical Co., Ltd.), Ajisper PB821 and PB711 (all of which are manufactured by Ajinomoto Co., Ltd.), and LP4010, LP4050, and LP4055, POLYMER 400, 401, 402, 403, 450, 451, and 453 (all of which are manufactured by EFKA-Chemicals B.V.).

Although the content of the dispersant in the ink composition can be appropriately selected depending on the pigment to be dispersed, the content is preferably not less than 5% by mass and not more than 200% by mass, and more preferably not less than 30% by mass and not more than 120% by mass with respect to the content of 100% by mass of the pigment in the ink composition.

Other Constituents

It is also possible to add other additives, which are included in general ink composition, to the ink composition according to an embodiment of the invention. Examples of other additives include stabilizer such as antioxidant and ultraviolet absorber and binder resin.

Examples of antioxidant include BHA (2,3-butyl-4-oxyanisole) and BHT (2,6-di-t-butyl-p-cresol).

Examples of ultraviolet absorber include a benzophenone system compound and a benzotriazole system compound.

In addition, binder resin may be added to the ink composition for the purpose of adjusting ink viscosity. Examples of binder resin include acrylic resin, styrene acrylic resin, rosin-modified resin, phenol resin, terpene resin, polyester resin, polyamide resin, epoxy resin, vinyl chloride-vinyl acetate copolymer resin, fiber resin such as cellulose acetate butyrate, vinyl toluene-α-methylstyrene copolymer resin. One kind or two or more kinds of such binder resin may be used alone or in combination.

Physical Property of Ink Composition

The surface tension of the ink composition according to an embodiment of the invention at 20° C. is preferably not less than 20 mN/m and not more than 50 mN/m and more preferably not less than 25 Mn/m and not more than 40 mN/m from a viewpoint of a balance between recording quality and reliability as ink jet ink composition. In addition, the surface tension can be measured by checking surface tension when a platinum plate is moistened with the ink in an environment at 20° C. by using an automatic surface tension measurer CBVP-Z (manufactured by Kyowa Interface Science Co., Ltd.).

From the same viewpoint, the viscosity of the ink composition at 20° C. is preferably not less than 2 mPa·s and not more than 15 mPa·s, and more preferably not less than 2 mPa·s and not more than 10 mPa·s. The viscosity can be measured by increasing a shear rate from 10 to 1000 in an environment at 20° C. and reading the viscosity when the shear rate is 200 by using a viscoelasticity testing machine MCR-300 (manufactured by Physica Corporation).

The aforementioned ink composition according to the embodiment is preferably used for recording an image on a low-absorbent recording medium.

The "low-absorbent recording medium" in this specification means a recording medium with a water absorption amount of not more than 10 mL/m$^2$ in 30 msec$^{1/2}$ from a start of contact based on the Bristow method, and any recording medium is applicable as long as at least the recorded surface thereof has the characteristic. The Bristow method is a method which has been most widely distributed as a method for measuring a liquid absorption amount in a short time and is also employed by Japan Technical Association of Pulp and Paper Industry (Japan TAPPI). The detail of the test method is described in Standard No. 51 "Paper and paperboard, liquid absorption property test method, Bristow method" in "JAPAN TAPPI paper pulp test methods 2000 edition". In addition, the low-absorbent recording medium also includes non-absorbent recording medium which does not absorb water at all.

Specific examples of the low-absorbent recording medium include a sheet, a film, and a fiber product which includes a low-absorbent material. In addition, the low-absorbent recording medium may be a recording medium provided with a layer, which includes a low-absorbent material (hereinafter, also referred to as a "low-absorbent layer"), on the surface of a base material (paper, fiber, leather, plastic, glass, ceramic, and metal, for example). Although the low-absorbent material is not particularly limited, examples thereof include olefin system resin, ester system resin, urethane system resin, acrylic resin, vinyl chloride system resin.

Among the above examples, a recording medium with a recorded surface which includes the vinyl chloride system resin can be preferably used as the low-absorbent recording medium. Specific examples of the vinyl chloride system resin include vinyl chloride system copolymer resin such as polyvinyl chloride resin, vinyl chloride-ethylene copolymer resin, vinyl chloride-vinyl acetate copolymer resin, vinyl chloride-vinyl ether copolymer resin, vinyl chloride-vinylidene chloride copolymer resin, vinyl chloride-maleic acid ester copolymer resin, vinyl chloride-(meth)acrylic acid copolymer resin, vinyl chloride-(meth)acrylic acid ester copolymer resin, and vinyl chloride-urethane copolymer resin. One kind or two or more kinds of the examples can be used alone or in combination. In this specification, "(meth)acryl" means at least one of acryl or corresponding methacryl.

Manufacturing Method of Ink Composition

The ink composition according to an embodiment of the invention can be manufactured by a known general method.

When pigment is used as colorant, the pigment, dispersant, and solvent (a part thereof) are firstly mixed, and pigment dispersion liquid is then prepared by ball mill, bead mill, ultrasonic waves, or jet mil and adjusted to have a desired ink characteristic. Then, the solvent (remaining amount) and other additives (surfactant and binder resin, for example) are added thereto while the dispersion liquid is stirred, and the ink composition can be obtained.

Recording Apparatus

Hereinafter, a description will be given of a preferable embodiment of a recording apparatus (liquid droplet ejecting apparatus).

Figure 2A:
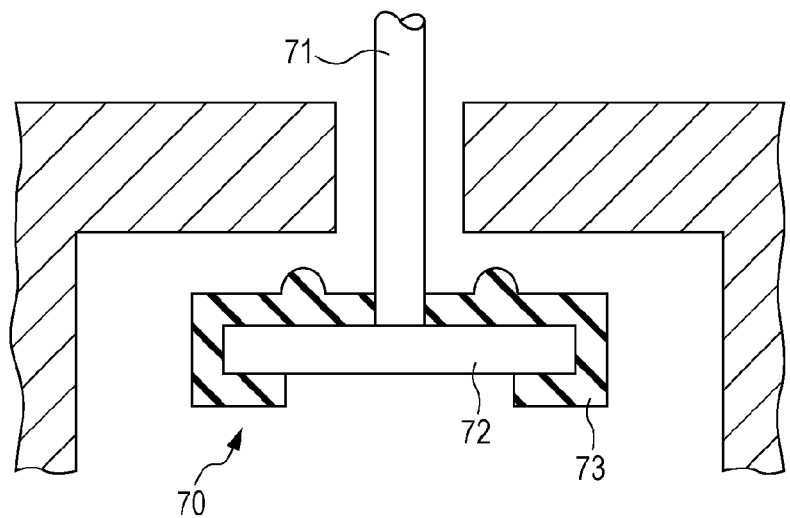
FIGS. 2A and 2B are cross-sectional views showing an example of a configuration and an operation of a pressure regulation valve.
Figure 2B:
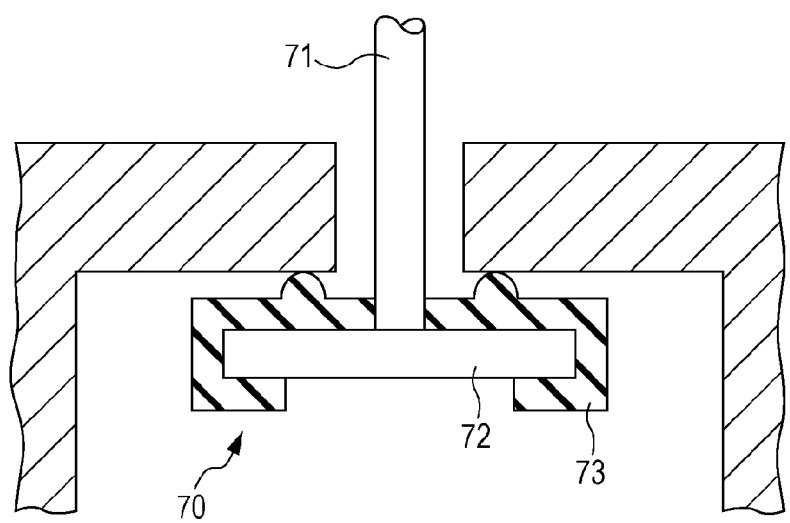

FIG. 1 is a diagram schematically showing an example of a recording apparatus (ink jet recording apparatus), and FIGS. 2A and 2B are cross-sectional views showing an example of a structure and an operation of a pressure regulation valve.

As shown in FIG. 1, an ink jet printer as the recording apparatus (hereinafter, referred to as a printer) 21 includes a frame 22 with a substantially cuboid shape and a platen 23 which is provided across the frame 22. A sheet is supplied on the platen 23 by a sheet feeding mechanism which is not shown in the drawing. Furthermore, a guide member 24 is provided across the frame 22 in parallel with the platen 23. A carriage 25 is inserted into and supported by the guide member 24 so as to be movable in an axial direction of the guide member 24. In addition, the carriage 25 is connected to a carriage motor 28 via a timing belt 27 and is reciprocated along the guide member 24 by the drive of the carriage motor 28.

In addition, a recording head 29 as a liquid droplet ejecting head is mounted on a surface of the carriage 25 facing the plate 23. Moreover, a valve unit 30 and a flow path valve 31 as an ink supplying valve unit for supplying the ink composition (hereinafter, also simply referred to as "ink") to a recording head 29 are mounted on the carriage 25. In this embodiment, four valve units 30B, 30C, 30M and 30Y and four flow path valves 31B, 31C, 31M, and 31Y are provided corresponding to the ink colors (respective color ink of black ink B, cyan C, magenta M, and yellow Y).

In addition, a nozzle ejection port which is not shown in the drawing is provided on the lower surface of the recording head 29. The ink is supplied from the valve units 30B, 30C, 30M and 30Y to the recording head 29 via the flow path valves 31B, 31C, 31M, and 31Y by drive of a piezoelectric element which is not shown in the drawing, liquid droplets of the ink composition are ejected to the recording medium, printing (recording) is then performed, and a recorded object is obtained.

On the other hand, four cartridge holders 32 are formed at the right end of the frame 22. In addition, an ink cartridge 33 as an ink container is detachably mounted on each of the cartridge holders 32. According to this embodiment, four ink cartridges 33B, 33C, 33M, and 33Y are provided corresponding to the ink colors. Each of the ink cartridges 33B, 33C, 33M, and 33Y is configured by an outer case 34, the inside of which is in an air-tight state, and an ink pack provided therein, which is not shown in the drawing. In the ink pack, each of the black ink B and the color ink C, M, and Y as the ink compositions according to an embodiment of the invention is reserved.

The ink pack in the ink cartridge 33 and the valve unit 30 are connected to each other via a tube 38 as a liquid supply path with flexibility. In this embodiment, four tubes 38B, 38C, 38M, and 38Y are provided corresponding to the ink colors.

In addition, an air pressurizing pump 39 is provided above the ink cartridge 33Y for reserving the yellow ink Y. The air pressurizing pump 39 is connected to each of the outer cases 34 of the ink cartridges 33B, 33C, 33M, and 33Y via air supply tubes 36B, 36C, 36M, and 36Y. Therefore, the air pressurized by the air pressurizing pump is introduced into the outer cases 34 of the ink cartridges 33B, 33C, 33M, and 33Y via the air supply tubes 36B, 36C, 36M, and 36Y, and then introduced into a space formed between the outer case and the ink packs. That is, if the air is introduced into the outer cases 34 by driving the air pressurizing pump 39, the ink packs are pressed by the pressurized air, and the respective ink reserved in the ink packs are supplied to the valve units 30B, 30C, 30M, and 30Y via the tubes 38B, 38C, 38M, and 38Y.

In addition, a choke valve 40 is provided in the course of the flow paths of the tubes 38B, 38C, 38M, and 38Y, namely on the upstream sides of the valve units 30B, 30C, 30M, and 30Y. In addition, the choke valve 40 is fixed to the frame 22 in the vicinity of the ink cartridge 33 so as to be able to change the flow amount of the ink flowing through the tubes 38. In this embodiment, the valve units 30, the flow path valves 31, the tubes 38, and the choke valve 40 configured a liquid supply path.

On the other hand, a capping mechanism 41 for sealing the nozzle forming surface of the recording head 29 is arranged in a non-printing region (home position) on a traveling route of the carriage 25. In addition, a cap member 41a, which can seal the nozzle forming surface by being brought into a close contact with the nozzle forming surface of the recording head 29 and is formed of an elastic material such as rubber is arranged on the upper surface of the capping mechanism 41.

Accordingly, if the carriage 25 travels to the home position, the capping mechanism 41 rises on the side of the recording head 29, the nozzle forming surface of the recording head 29 is sealed by the cap member 41a, and the capping mechanism 41 prevent the opening of the nozzle from drying to the maximum extent.

In addition, a suctioning pump (tube pump) which is not shown in the drawing is arranged below the cap member 41a. The suctioning pump is connected to the lower portion of the cap member 41a via a suctioning tube. If the suctioning pump is driven, air is suctioned from the cap member 41a which covers the recording head 29, and the ink is suctioned and discharged from the recording head 29. Furthermore, a wiping member 42 is arranged so as to be adjacent to the capping member 41 on the side of the printing region. The wiping member 42 is formed of strip-shaped elastic materials such as rubber. In addition, the wiping member 42 advances along the traveling route of the recording head 29 in a horizontal direction and wipes and cleans the nozzle forming surface as necessary.

A pressure regulation valve 70 as shown in FIGS. 2A and 2B is provided in an ink flow path inside each of the aforementioned valve units 30 (30B, 30C, 30M, and 30Y).

The pressure regulation valve 70 includes a cylindrical rod portion 71 which is inserted into and arranged in the ink flow path, a substantially disc-shaped plate portion 72 which is provided at the tip end of the rod portion 71 and is larger than the outer diameter of the flow path, and a sealing portion (elastic member) 73 which is provided so as to cover a surface of the plate portion 72 on the side of the rod portion 71 (a contact surface when the plate portion 72 is in contact with the rod portion 71 and blocks the flow path), a side surface of the plate portion 72, and a part of a non-contact surface on the opposite side of the contact surface. A covering structure of the elastic member is not limited to the above specification. However, the problem of the present application is often caused by the pressure regulation valve 70 with the elastic member partially covering the non-contact surface although such a pressure regulation valve 70 is preferable from a viewpoint of easy fabrication. However, since it is possible to solve the problem by employing the aforementioned ink composition, more significant effects can be achieved by the combination of both.

Such a pressure regulation valve 70 configures an opening state (FIG. 2A) and a closing state (FIG. 2B) of the ink flow path by being driven in the longitudinal direction of the rod portion 71.

As a material configuring the elastic member, at least one kind selected from a group consisting of natural rubber, styrene-butadiene rubber, acrylonitrile-butadiene rubber, chloroprene rubber, neoprene rubber, polyvinyl chloride, polyethylene, polypropylene, acrylonitrilebutadiene, polystyrene, polyamide, polyurethane, silicon resin, epoxy resin, phenol resin, urea resin, and fluorine resin.

Hereinafter, a detailed description will be given of a function effect of the pressure regulation valve based on examples.

Figure 3:
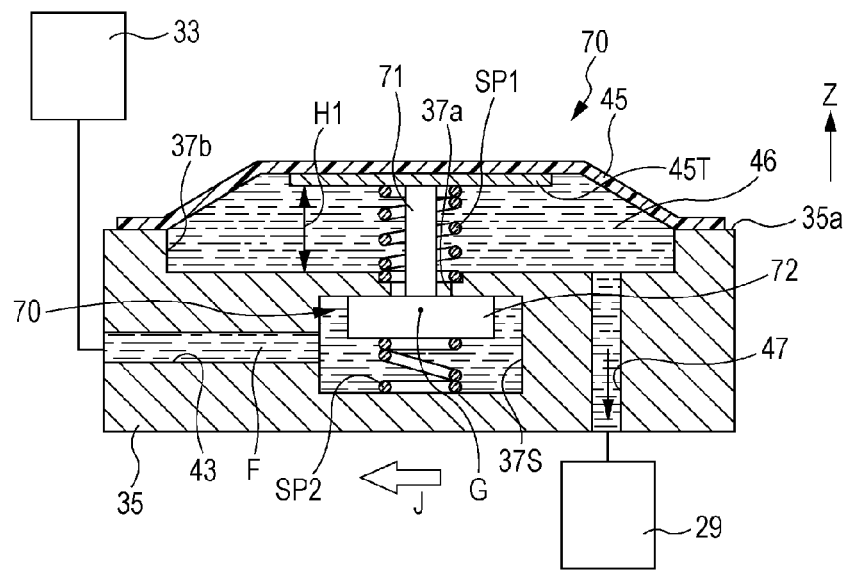
FIG. 3 is a cross-sectional view for illustrating a function effect of the pressure regulation valve.
Figure 4:
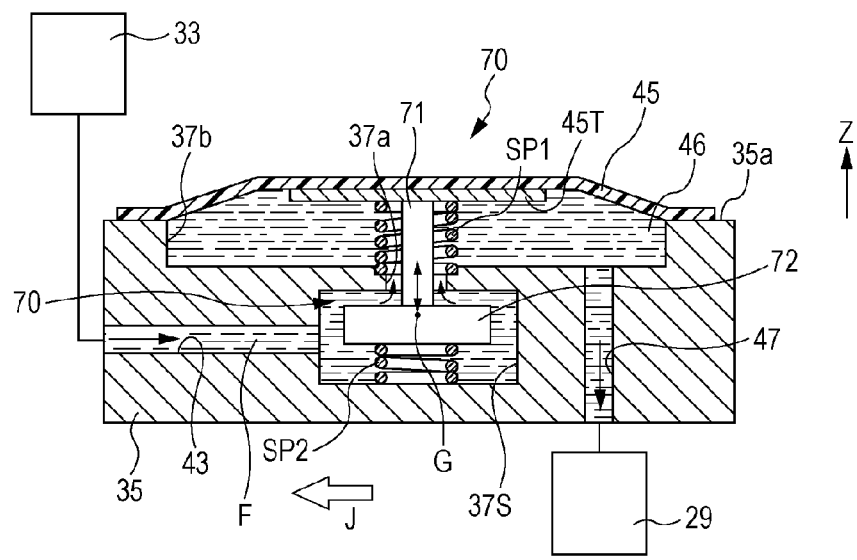
FIG. 4 is a cross-sectional view for illustrating a function effect of the pressure regulation valve.

FIGS. 3 and 4 are cross-sectional views for illustrating a function effect of the pressure regulation valve.

In FIG. 3, an introducing path 43 which extends toward the inside of a valve main body 35 is formed at the valve 35 of the pressure regulation valve 70. The introducing path 43 communicates with the ink cartridge 33 and introduces fluid F from the ink cartridge 33 to the inside of the valve main body 35. A space (valve body accommodating chamber 37S) with a square cross-sectional shape provided within the valve main body 35 is formed on one side of the introducing path 43 (the opposite side facing the ink cartridge 33: downstream side).

The valve body accommodating chamber 37S accommodates the ink from the introducing path 43. A circular hole (communication hole 37a) which extends in a direction of the arrow Z is formed above the valve body accommodating chamber 37S, and a concave portion (pressurized concave portion 37b) which communicates with the communication hole 37a and opens in the upper surface 35a of the valve main body 35 is formed so as to open above the communication hole 37a.

A flexible pressurized sheet 45 which can be bent in the vertical direction is attached to the upper surface 35a of the valve main body 35. A space (pressurized chamber 46) which is surrounded by the pressurized concave portion 37b and the pressurized sheet 45 so as to vary the volume thereof when the pressurized sheet 45 seals the pressurized concave portion 37b is formed. The pressurized chamber 46 accommodates the ink from the valve body accommodating chamber 37S in communication.

A pressurized plate 45T which can be displaced in the vertical direction is attached to the lower side of the pressurized sheet 45, and a coil spring SP1 is disposed between the pressurized plate 45T and the bottom surface of the pressurized concave portion 37b. The coil spring SP1 biases the pressurized plate 45T (pressurized sheet 45) upward such that the pressurized plate 45T (pressurized sheet 45) and the bottom surface of the pressurized concave portion 37b are separated from each other by a predetermined distance ("normal distance H1"). In this embodiment, a pressure in the pressurized chamber 46, at which the distance between the pressurized plate 45T and the bottom surface of the pressurized concave portion 37b is the "normal distance H1" is referred to as a "normal pressure".

A lead-out path 47 which extends in an opposite direction to the arrow Z is formed on the downstream side of the pressurized chamber 46. The lead-out path 47 is a flow path for communicating the pressurized chamber 46 with the recording head 29 and leads out the ink from the pressurized chamber 46 to the recording head 29.

When the ink in the pressurized chamber 46 is led out to the recording head 29, the pressure in the pressurized chamber 46 is lower than the "normal pressure", and the pressurized plate 45T (pressurized sheet 45) moves downward against the bias force of the coil spring SP1.

The pressure regulation valve 70 formed into a spinning top shape is arranged inside the valve body accommodating chamber 37S. The pressure regulation valve 70 includes a disc-shaped plate portion 72 and a rod portion 71 which extends from a center position of the plate portion 72 in a direction of the arrow Z, and is formed such that a gravity center G thereof is located at a substantially center position of the plate portion 72. The pressure regulation valve 70 is configured such that the plate portion 72 thereof is arranged inside the valve body accommodating chamber 37S and the rod portion 71 thereof communicates with the communication hole 37a. The communication hole 37a accepts only vertical movement of the pressure regulation valve 70.

A coil spring SP2 as a biasing mechanism for biasing the pressure regulation valve 70 upward is arranged below the pressure regulation valve 70. The bias force of the coil spring SP2 brings the plate portion 72 of the pressure regulation valve 70 into contact with the upper surface of the valve body accommodating chamber 37S and blocks the communication between the valve body accommodating chamber 37S and the pressurized chamber 46 when the pressure in the pressurized chamber 46 is the "normal pressure".

According to the embodiment, a position, at which the pressure regulation valve 70 is arranged, the plate portion 72 of the pressure regulation valve 70 is in contact with the upper surface of the valve body accommodating chamber 37S, and the communication between the valve body accommodating chamber 37S and the pressurized chamber 46 is blocked, is referred to as a "valve closing position". In addition, a position, at which the pressure regulation valve 70 is arranged and the communication between the valve body accommodating chamber 37S and the pressurized chamber 46 is established, below the "valve closing position" is referred to as a "valve opening position".

As shown in FIG. 4, the pressurized plate 45T moves downward against the bias force of the coil springs SP1 and SP2 and moves the pressure regulation valve 70 (gravity center G) downward from the "valve closing position" to the "valve opening position" when the fluid F in the pressurized chamber 46 is led out to the recording head 29 and the pressure in the pressurized chamber 46 becomes lower than the "normal pressure". The valve body accommodating chamber 37S communicates with the pressurized chamber 46 via the communication hole 37a, leads out the fluid F in the valve body accommodating chamber 37S to the inside of the pressurized chamber 46, and compensates for the decrease in the pressure in the pressurized chamber 46 when the pressure regulation valve 70 moves downward to the "valve opening position". The pressure regulation valve 70 moves upward again to the "valve opening position" by the bias force of the coil springs SP1 and SP2 and blocks the communication between the valve body accommodating chamber 37S and the pressurized chamber 46 when the pressure in the pressurized chamber returns to the "normal pressure" again. That is, the pressure regulation valve 70 blocks the introduction of the fluid F from the valve body accommodating chamber 37S and maintains the pressure in the pressurized chamber 46 at the "normal pressure". In doing so, the pressure regulation valve 70 maintains the pressure of the fluid F, which is to be supplied to the recording head 29, at the "normal pressure".

At this time, a direction of the opening and closing operations (a direction from the "valve closing position" to the "valve opening position") of the pressure regulation valve 70 according to the embodiment is vertical direction, namely a direction which is perpendicular to a scanning direction J (XY plane direction). That is, a direction in which the "gravity center G" moves is the opening and closing direction of the pressure regulation valve 70. For this reason, the pressure regulation valve 70 according to the embodiment opens only by the pressure in the pressurized chamber 46 and maintains the supply pressure of the fluid F at the "normal pressure" as long as an acceleration direction of the pressure regulation valve 70 is not the vertical direction.

The pressure regulation valve 70 receives stress in the XY plate direction in response to the acceleration of the head unit when the head unit accelerates or decelerates in the scanning direction J (XY plane direction). On the other hand, the stress in the XY plane direction acts in a direction which is perpendicular to a direction in which the "gravity center G" of the pressure regulation valve 70 moves when the pressure regulation valve 70 opens or closes. For this reason, the pressure regulation valve 70 does not open or close by the acceleration or deceleration of the head unit and opens or closes only by the pressure in the pressurized chamber 46. As a result, the pressure regulation valve 70 can maintain the pressure of the ink F, which is to be supplied to the recording head 29, at the "normal pressure" regardless of the acceleration or the deceleration of the head unit. Accordingly, the embodiments of the invention can be applied to both the serial head printer and the line head printer.

The printer provided with the pressure regulation valve configured as described above has a problem that the ink composition in the related art adversely affects the sealing portion 73, and for example, the sealing portion (elastic member) 73 separates from the plate portion 72, and the flow path cannot be opened and closed. However, it is possible to solve such a problem by using the ink composition according to the embodiment of the invention.

Although the above description was given of the invention based on preferable embodiments, the embodiments of the invention are not limited thereto.

EXAMPLES

Next, a description will be given of specific examples of the invention.
1. Ink Composition Example 1

Diethylene glycol diethyl ether (manufactured by Nippon Nyukazai Co., Ltd.), γ-butyrolactone (manufactured by Kanto Kagaku Co., Ltd.), tetraethylene glycol dimethyl ether (product name "Hisov METM", manufactured by Toho Chemical Industry Co., Ltd.), tetraethylene glycol monobutyl ether (product name "BTG-H", manufactured by Toho Chemical Industry Co., Ltd.), and Equamide M100 (manufactured by Idemitsu Retail Marketing Co., Ltd., amide ether solvent) at amounts corresponding to concentration shown in Table 1 were poured into a container, the mixture was mixed and stirred for thirty minutes by using a magnetic to stir, and a mixed medium was obtained.

A part of the obtained mixed medium was extracted, predetermined amounts of Solsperse 37500 (manufactured by The Lubrizol Corporation, product name) and C.I. Pigment Black 7 (manufactured by Mitsubishi Chemical Corporation, product name "Carbon Black #970") were added thereto, and the mixture was subjected to pulverization treatment by using a homogenizer. Thereafter, dispersion treatment was performed thereon by bead mill which was filled with zirconia beads with a diameter of 0.3 mm, and pigment dispersion liquid (average particle size of pigment: 150 nm) was then obtained.

The residual of the mixed medium and BYK-375 (manufactured by BYK Additives and Instruments, polyether ester-modified dimethylsiloxane), Pararoid B60 (manufactured by Rohm and Haas Japan K.K., acrylic resin) were added to the obtained pigment dispersion liquid, the mixture was further mixed and stirred for one hour, and filtered by using a membrane filter made of PTFE with a pore diameter of 5 μm. The concentration thereof was adjusted by isopropyl alcohol, and black ink composition was then obtained.

Examples 2 to 8 and Comparative Examples 1 and 2

The ink composition was manufactured in the same manner as in Example 1 other than that the respective constituents shown in Table 1 were used and the ink composition was adjusted to have the concentration shown in Table 1.

In addition, BYK-315 (polymethylalkyl siloxane) corresponds to a constituent of Equation (1) where n is from 100 to 200, BYK-375 (polyether ester-modified dimethylsiloxane) corresponds to a constituent of Equation (1) where n is from 45 to 180, and BYK-378 (polydimethylsiloxane) corresponds to a constituent of Equation (1) where n is from 80 to 230. In the table, Pigment Black 7 represents C.I. Pigment Black 7.

The respective ink composition was excellent in the ejection stability.

TABLE 1

| | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| | Pigment Black 7 | 4 | 4 | 4 | 4 | 4 | 4 | 4 | 4 | 4 | 4 |
| | Solsperse 37500 | 4 | 4 | 4 | 4 | 4 | 4 | 4 | 4 | 4 | 4 |
| | Diethylene glycol diethyl ether | 40 | 40 | 40 | 40 | 40 | 40 | 40 | 40 | 40 | 40 |
| | γ-butyrolactone | 10 | 8 | 5 | 4 | 5 | 5 | 20 | 5 | — | — |
| | Tetraethylene glycol dimethyl ether | 10 | 10 | 10 | 10 | 10 | 10 | 10 | 10 | 10 | 10 |
| | Tetraethylene glycol monobutyl ether | 3 | 3 | 3 | 3 | 3 | 3 | 3 | 3 | 3 | 3 |
| | Pararoid B60 | 2 | 2 | 2 | 2 | 2 | 2 | 2 | 2 | 2 | 2 |
| | Equamide M100 | 9 | 9 | 9 | 9 | 9 | 9 | 9 | 9 | 9 | 9 |
| | BYK-315 (polymethylalkyl siloxane) | — | — | — | — | 0.6 | — | — | — | — | — |
| | BYK-375 (polyether ester-modified dimethylsiloxane) | 0.6 | 0.6 | 0.6 | 0.6 | — | — | 0.6 | — | 0.6 | — |
| | BYK-378 (polydimethylsiloxane) | — | — | — | — | — | 0.6 | — | — | — | — |
| | CERACOL39 (polyethylene wax) (solid content: 40%) | — | — | — | — | — | — | — | 1.5 (solid content: 0.6) | — | — |
| | Isopropyl alcohol | Remaining amount | Remaining amount | Remaining amount | Remaining amount | Remaining amount | Remaining amount | Remaining amount | Remaining amount | Remaining amount | Remaining amount |
| | Total | 100 | 100 | 100 | 100 | 100 | 100 | 100 | 100 | 100 | 100 |
| Evaluation | Operation of pressure regulation valve (main problem) | ○ | ○ | ○ | ○ | ○ | ○ | ○ | ○ | X | ○ |
| | Abrasion resistance (main problem) | A | A | A | A | A | A | A | A | A | C |
| | Reserving stability | B | A | A | A | A | A | C | A | A | A |

2. Evaluation
2.1. Operation Test of Pressure Regulation Valve

The pressure regulation valve shown in FIGS. 2A and 2B was filled with the ink composition in Examples and Comparative Examples and left for one hour in an environment at 40° C.

Then, the pressure regulation valve is assembled with a non-cyclic flow path configured by an ink composition supply tank, a tube, a liquid feeding pump, and a waste liquid tank, and further, a pressure meter was assembled on the downstream side of the pressure regulation valve.

The liquid feeding pump was operated at a constant speed in the environment at 40° C., and meanwhile, the operation of the pressure regulation valve was checked by monitoring the pressure in the flow path. Operation determination criteria are as follows.
O: The pressure in the flow path is a constant value, and the pressure regulation valve is operated normally.
X: The pressure in the flow path is not a constant value, and the pressure regulation valve is not operated normally.

2.2 Evaluation of Abrasion Resistance

An ink jet printer (manufactured by J. Roland DG Corporation, "VS-640" model) to a recording medium guiding portion of which a temperature variable heater was attached was used to perform solid printing on vinyl chloride system resin (manufactured by 3M Company, product name "IJ-40") by using the ink composition in Examples and Comparative Examples at a concentration of 100%, and a recorded object was obtained. The recording condition was set such that the heater setting of the printer was set to "setting for raising the temperature of the recorded surface to 40° C." Thereafter, the obtained recorded object was allowed to remain in a laboratory in an environment at a room temperature (25° C.) for five hours.

Then, the abrasion resistance was evaluated by rubbing the recorded surface of the recorded object ten times with cotton cloth under a load of 200 g by using a JSPS type color fastness rubbing tester (manufactured by Tester Sangyo Co., Ltd., product name "AB-301") and checking a recorded surface peeling state and a state of the ink transferring to the cotton cloth. Evaluation criteria will be shown below. In addition, "A" and "B" represent acceptable ranges in practical use.
A: Ink peeling and ink transferring to the cotton cloth were not observed after rubbing the recorded surface ten times.
B: Ink peeling and ink transferring to the cotton cloth were slightly observed after rubbing the recorded surface ten times.
C: Ink peeling and ink transferring to the cotton cloth were observed after rubbing the recorded surface ten times.

2.3. Evaluation on Reserving Stability

The ink composition in Examples and Comparative Examples was completely sealed and allowed to remain in an environment at 60° C. for five days. Then, the reserving stability was evaluated by comparing the particle size of the pigment at 20° C. before reserving the ink with the particle size of the pigment at 20° C. after the reserving the ink.

As for the particle size of the pigment, an average particle size was measured by a laser Doppler type particle size distribution measurement machine Microtrac UPA150 (manufactured by Nikkiso Co., Ltd.) after maintaining the ink composition at 20° C. for one hour. Evaluation criteria will be shown below. In addition, "A" and "B" among the evaluation criteria represent acceptable ranges in practical use.
A: A variation rate of the average particle size is within 2.5%.
B: A variation rate of the average particle size is not less than 2.5% and less than 5.0%.
C: A variation rate of the average particle size is not less than 5.0%.

The results were shown together in Table 1.

As can be obviously understood from Table 1, the ink composition according to the embodiments of the invention suppressed the disturbance of the opening and closing operations of the pressure regulation valve. In addition, the image recorded with the ink composition according to the embodiments of the invention was excellent in the abrasion resistance. Moreover, the ink composition was excellent in the reserving stability. On the other hand, satisfactory results cannot be obtained in Comparative Examples.

What is claimed is:

1. An ink composition used in a recording apparatus provided with a pressure regulation valve which performs opening and closing operations to adjust a pressure in a recording head, the pressure regulating valve forming a portion of an ink flow path of the recording head, wherein the pressure regulating valve allows the ink composition to flow through the ink flow path during the opening operation and prevents the ink from flowing through the ink flow path during the closing operation, the pressure regulating valve includes a plate that contacts another portion of the pressure regulating valve to close the ink flow path during the closing operation and is released from contact with the another portion of the pressure regulating valve during the opening operation, and the plate is enveloped by an elastic seal such that a surface of the plate that contacts the another portion of the pressure regulating valve is entirely covered with the elastic seal while another surface of the plate is partially not covered with the elastic seal, the ink composition comprising:
a slip agent; and
a lactone system medium.

2. The ink composition according to claim 1, wherein the slip agent is at least one selected from a group consisting of a silicon system compound, a hydrocarbon system compound, a fluorine system compound, an amide system compound, and an acrylic compound.

3. The ink composition according to claim 2, wherein the silicon system compound is a compound represented by the following Formula (1):

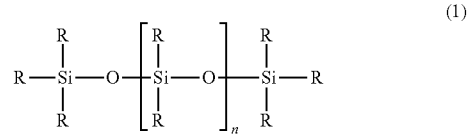

(1)

(where, n is an integer from 6 to 230, R independently represents hydrogen or a hydrocarbon group, and a part of R may be modified with ether, polyester, epoxy, amine, carboxyl, fluorine, alkyloxy, mercapto, (meth) acryl, phenol, phenyl, cabinol, or aralkyl).

4. The ink composition according to claim 1, wherein a content of the slip agent is not more than 1% by mass.

5. The ink composition according to claim 1, wherein the lactone system medium is γ-lactone.

6. The ink composition according to claim 5, wherein the γ-lactone is at least one selected from a group consisting of γ-butyrolactone and γ-valerolactone.

7. The ink composition according to claim 1, wherein the elastic seal is formed from at least one material selected from a group consisting of natural rubber, styrene-butadiene rubber, acrylonitrile-butadiene rubber, chloroprene rubber, neoprene rubber, polyvinyl chloride, polyethylene, polypropylene, acrylonitrilebutadiene, polystyrene, polyamide, polyurethane, silicon resin, epoxy resin, phenol resin, urea resin, and fluorine resin.

8. A recording apparatus comprising:
a recording head having an ink flow path;
a pressure regulation valve which performs opening and closing operations to adjust a pressure in a recording head, the pressure regulating valve forming a portion of the ink flow path of the recording head; and
an ink composition comprising a slip agent and a lactone system medium,
wherein the pressure regulating valve allows the ink composition to flow through the ink flow path during the opening operation and prevents the ink from flowing through the ink flow path during the closing operation,
the pressure regulating valve includes a plate that contacts another portion of the pressure regulating valve to close the ink flow path during the closing operation and is released from contact with the another portion of the pressure regulating valve during the opening operation, and
a surface of the plate that contacts the another portion of the pressure regulating valve is entirely covered with an elastic seal while another surface of the plate is partially not covered with the elastic seal.

9. The recording apparatus according to claim 8, wherein the slip agent is at least one selected from a group consisting of a silicon system compound, a hydrocarbon system compound, a fluorine system compound, an amide system compound, and an acrylic compound.

10. The recording apparatus according to claim 9, wherein the silicon system compound is a compound represented by the following Formula (1):

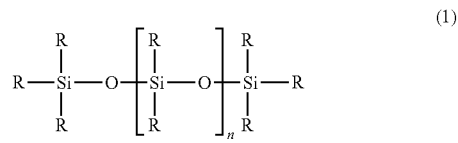

(where, n is an integer from 6 to 230, R independently represents hydrogen or a hydrocarbon group, and a part of R may be modified with ether, polyester, epoxy, amine, carboxyl, fluorine, alkyloxy, mercapto, (meth) acryl, phenol, phenyl, cabinol, or aralkyl).

11. The recording apparatus according to claim 8, wherein a content of the slip agent is not more than 1% by mass.

12. The recording apparatus according to claim 8, wherein the lactone system medium is γ-lactone.

13. The recording apparatus according to claim 12 wherein the γ-lactone is at least one selected from a group consisting of γ-butyrolactone and γ-valerolactone.

14. The recording apparatus according to claim 8, wherein the elastic seal is formed from a material selected from a group consisting of natural rubber, styrene-butadiene rubber, acrylonitrile-butadiene rubber, chloroprene rubber, neoprene rubber, polyvinyl chloride, polyethylene, polypropylene, acrylonitrilebutadiene, polystyrene, polyamide, polyurethane, silicon resin, epoxy resin, phenol resin, urea resin, and fluorine resin.

* * * * *